United States Patent [19]

Kao

[11] Patent Number: 5,666,763
[45] Date of Patent: Sep. 16, 1997

[54] AGRICULTURAL PRODUCT PRESERVING DEVICE

[76] Inventor: Chih-Chuan Kao, No. 67, Kuang-Min St., Pan Chiao City, Taipei Hsien, Taiwan

[21] Appl. No.: 550,646

[22] Filed: Oct. 31, 1995

[51] Int. Cl.$^6$ ................................................ B65D 85/50
[52] U.S. Cl. ...................... 47/84; 206/423; 426/118; 426/119; 426/415
[58] Field of Search .................. 47/84 R, 84 B, 47/84 BC; 426/118, 119, 415; 206/423

[56] References Cited

U.S. PATENT DOCUMENTS

| | | | |
|---|---|---|---|
| 3,712,848 | 1/1973 | Casey | 426/118 |
| 4,910,032 | 3/1990 | Antoon | 426/118 |
| 5,480,693 | 1/1996 | Patterson | 426/118 |

FOREIGN PATENT DOCUMENTS

| | | | |
|---|---|---|---|
| 2247027 | 4/1972 | Germany | 47/84 R |
| 477902 | 11/1975 | U.S.S.R. | 47/84 |

*Primary Examiner*—Henry E. Raduazo
*Attorney, Agent, or Firm*—Bacon & Thomas

[57] ABSTRACT

Disclosed is an agricultural product preserving device capable of preserving agricultural products for a long period of time. The agricultural product preserving device comprises an air-permeable package box; a composite bag, placed in the package box, for containing agricultural product to be preserved; and a heat-dissipating tube placed in the composite bag and having a hollowed inside for dissipating heat. Moreover, flowers can be divided into a number of small bunches and a number of separate containers packed in the composite bag are used to contain these bunches of flowers. This can prevent the heat produced due to the squeezing of a large bunch of flowers against each other from being produced, so that the preservation period of the flowers can be increased.

9 Claims, 9 Drawing Sheets

FIG. 5
FIG. 6
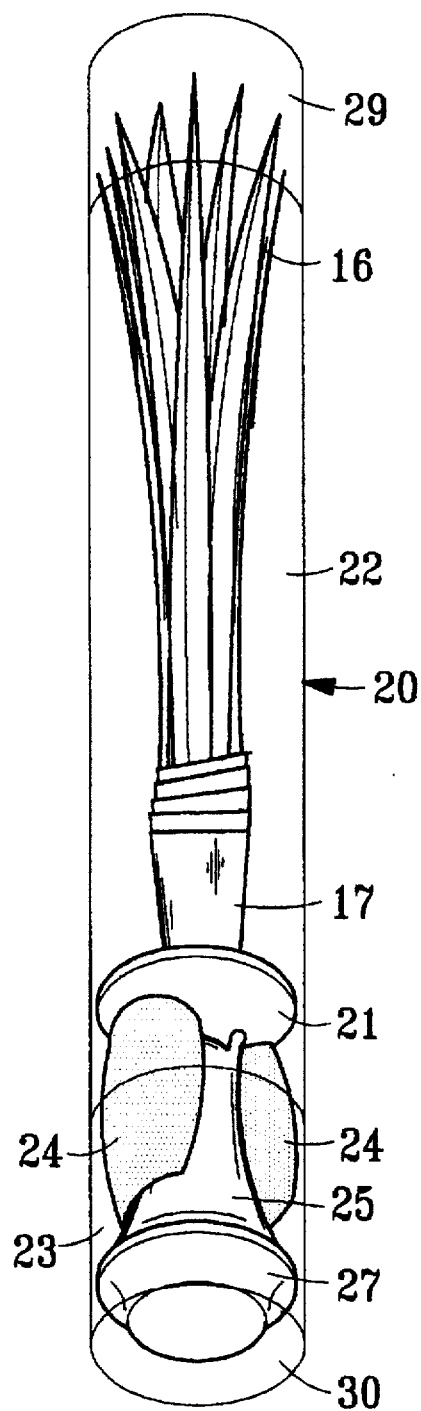
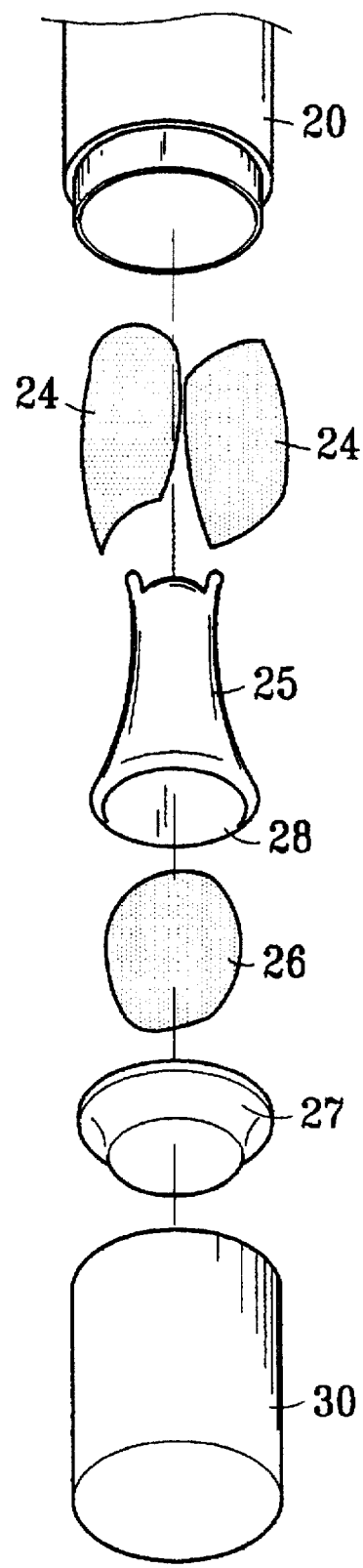

5,666,763

1

AGRICULTURAL PRODUCT PRESERVING DEVICE

BACKGROUND OF THE INVENTION

The present invention relates to preserving devices, and more particularly, to a device for preserving agricultural products.

In the event of adverse weather conditions such as typhoon or hurricane or during winter times, the supply of fresh vegetables or flowers to the consumer is usually in short-age. This often causes an imbalance between supply and demand and thus causing an inflation in the prices of these agricultural products. There exists therefore a need for an agricultural product preserving device capable of preserving agricultural products for a long period of time after harvest.

Moreover, some agricultural products as flowers can not be maintained fresh for a long period of time during storage or transpiration. In other words, flowers get withered quickly after being cropped in the garden so that they must be quickly sent to the market for immediate sale. Therefore, in such times as Valentine's day or other major festivals when the demand for flowers is great, the supply usually can not meet the demand. The lack of proper means capable of storing the flowers for a long period of time thus affects the overall economical system capable of providing a stable supply that usually meets the demand.

SUMMARY OF THE INVENTION

It is therefore a primary objective of the present invention to provide an agricultural product preserving device capable of preserving agricultural products for a long period of time.

It is therefore a primary objective of the present invention to provide an agricultural product preserving device capable of storing such agricultural products as flowers well in advance so as to meet further demand.

In accordance with the foregoing and other objectives of the present invention, there is provided with a novel agricultural product preserving device. The agricultural product preserving device comprises (a) an air-permeable package box; (b) a composite bag, placed in the package box, for containing agricultural product to be preserved; and (c) a heat-dissipating tube placed in the composite bag and having a hollowed inside for dissipating heat.

The composite bag includes (i) a one-way infiltrative layer capable of allowing moisture produced by the agricultural product to infiltrate from inside to outside while preventing moisture on the outside to penetrate therethrough to the inside; (ii) an absorbent layer laying upon the one-way infiltrative layer, capable of holding moisture penetrating through the one-way infiltrative layer while allowing air to pass therethrough; and (iii) an air-permeable waterproof layer laying upon the absorbent layer, capable of preventing moisture held in the absorbent layer from draining to the outside while allowing air to penetrate therethrough to the outside.

BRIEF DESCRIPTION OF DRAWINGS

The present invention can be more fully understood by reading the subsequent detailed description of the preferred embodiments thereof with references made to the accompanying drawings, wherein.

2

Figure 1:
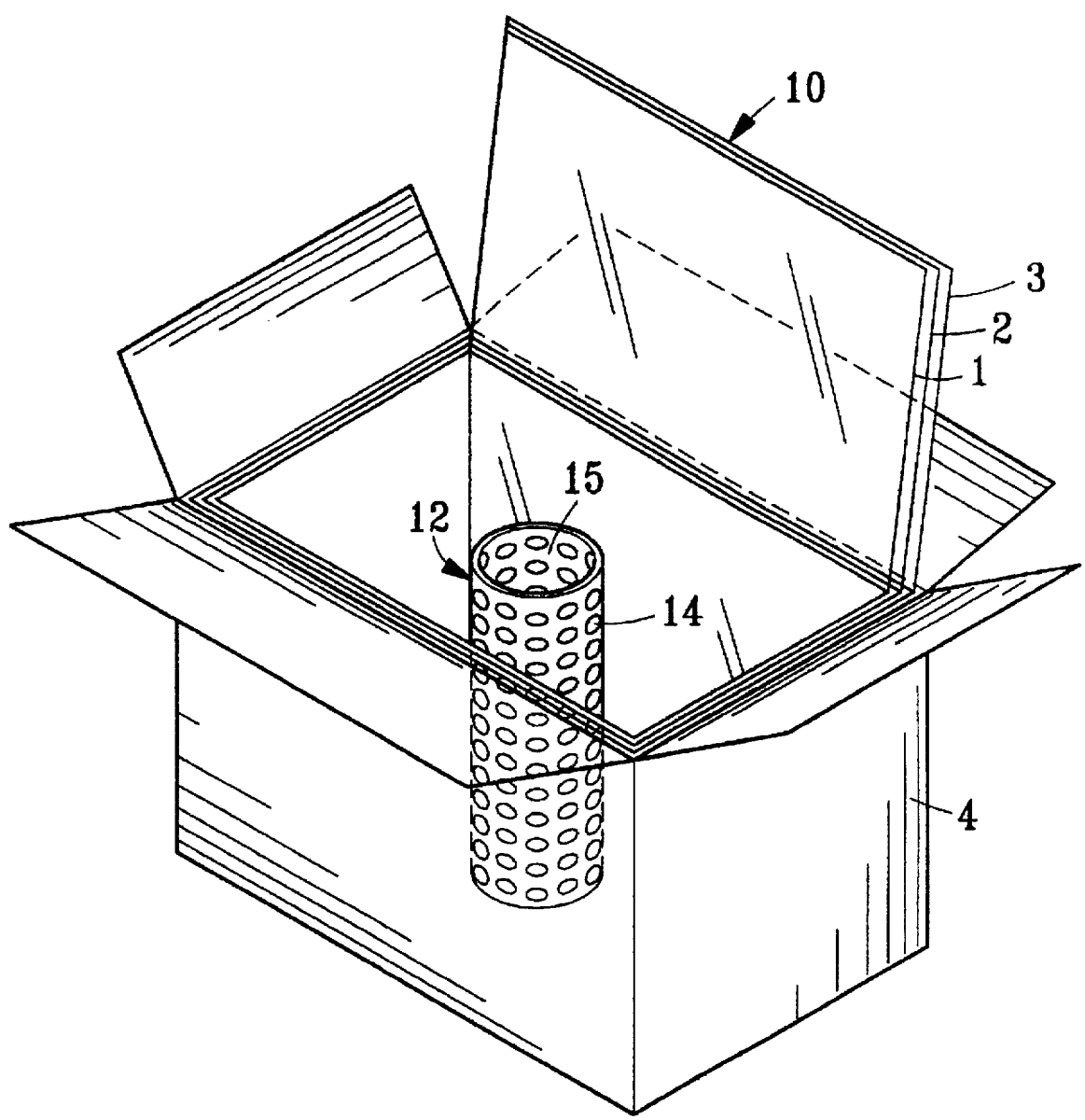
FIG. 1 shows a perspective view of the agricultural product preserving device according to the present invention.
Figure 2:
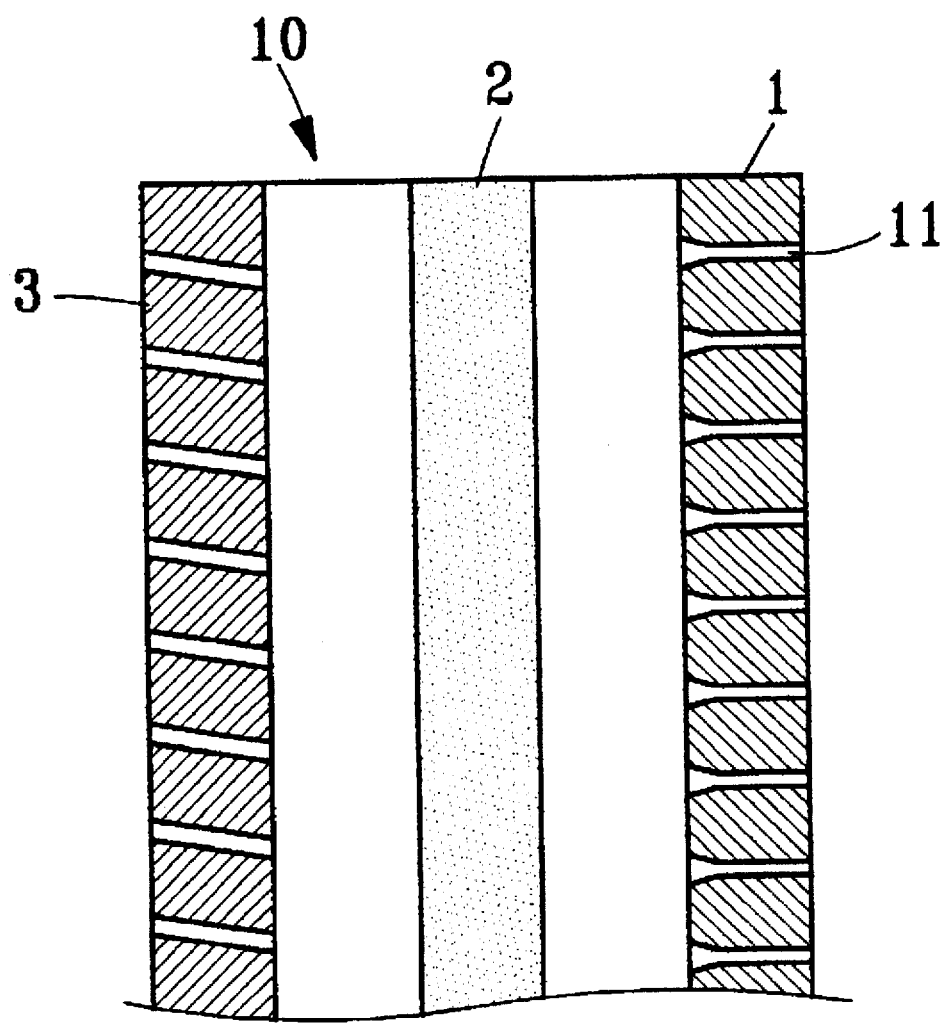
Figure 3:
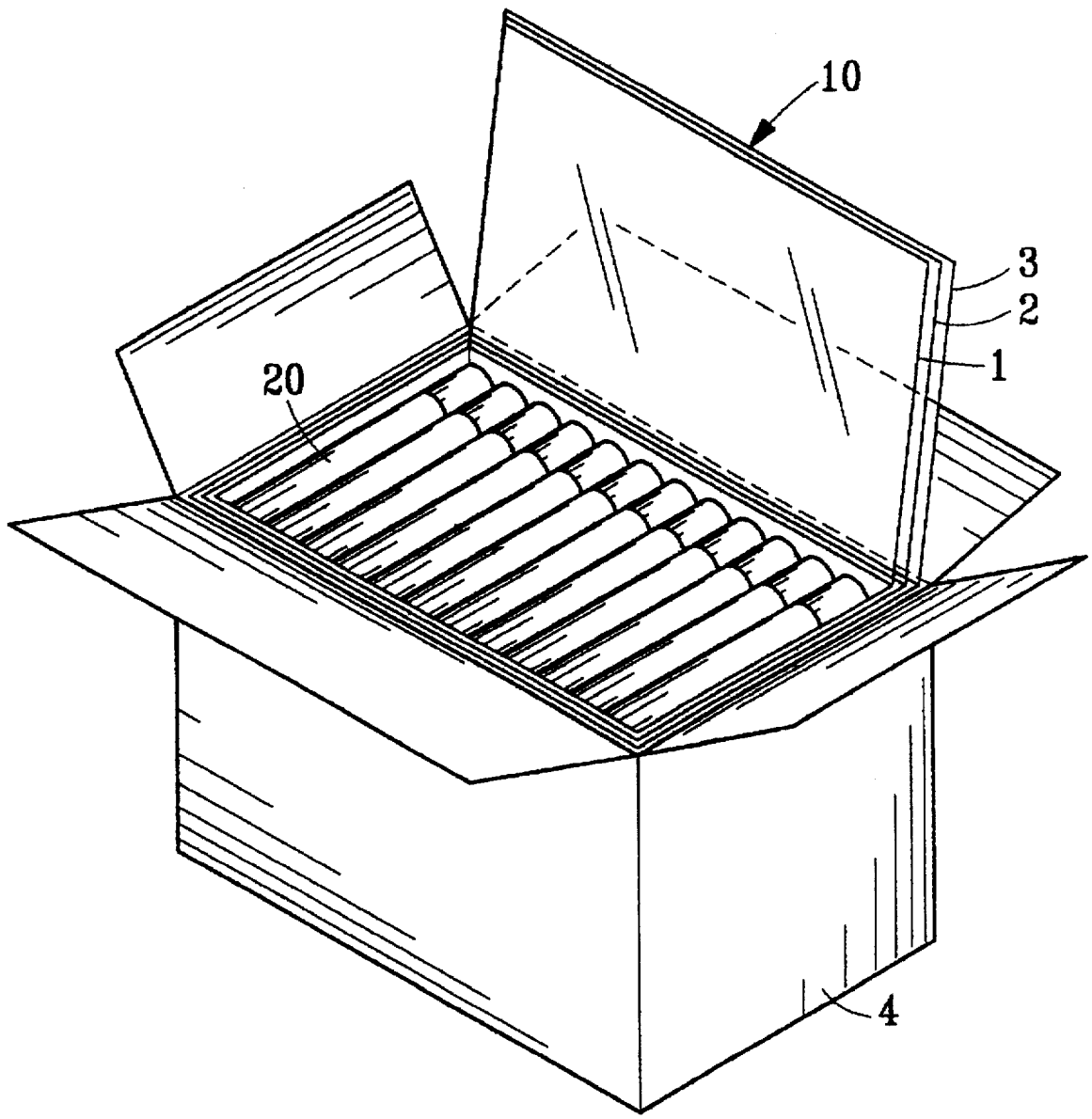
Figure 4:
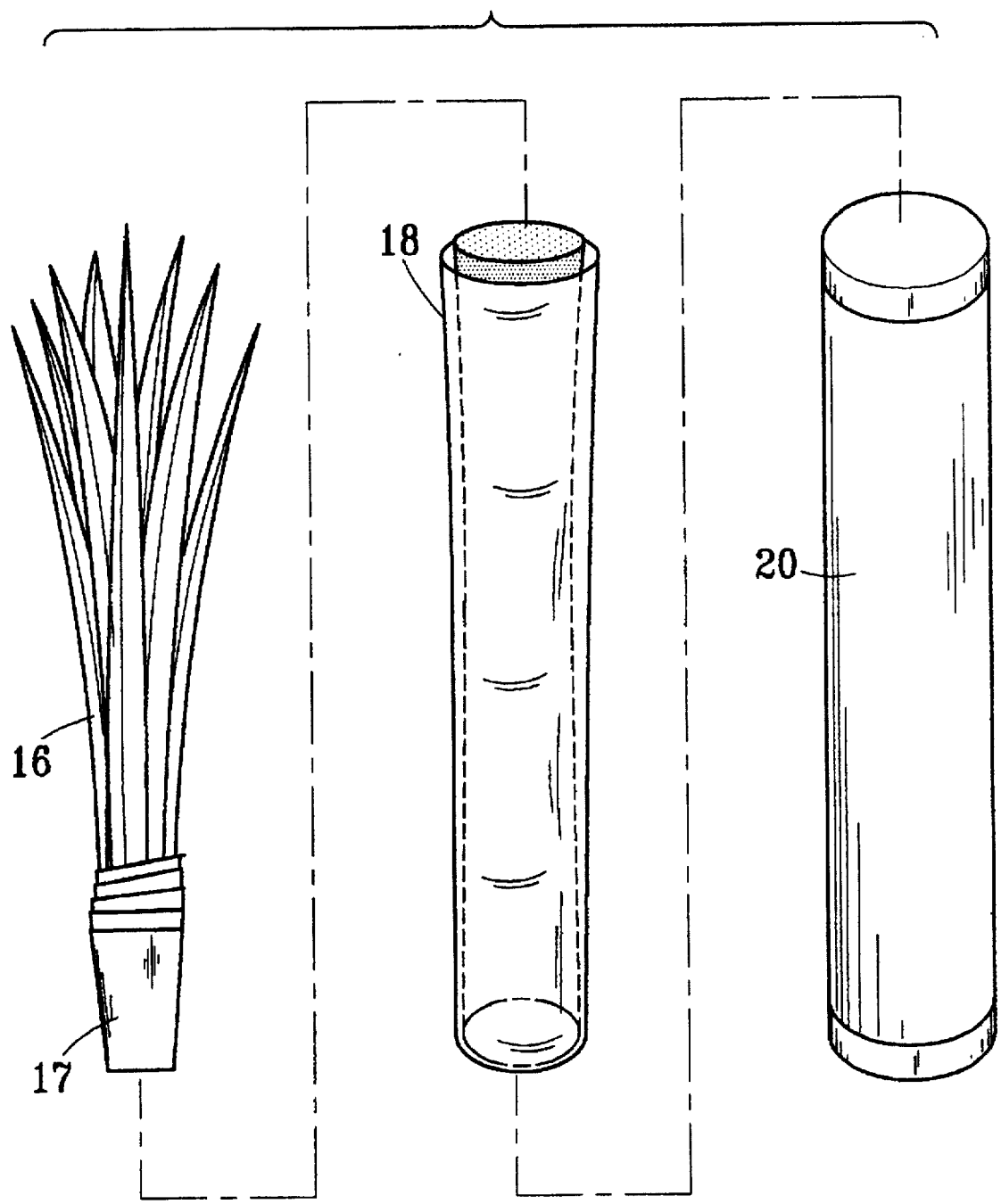
Figure 7:
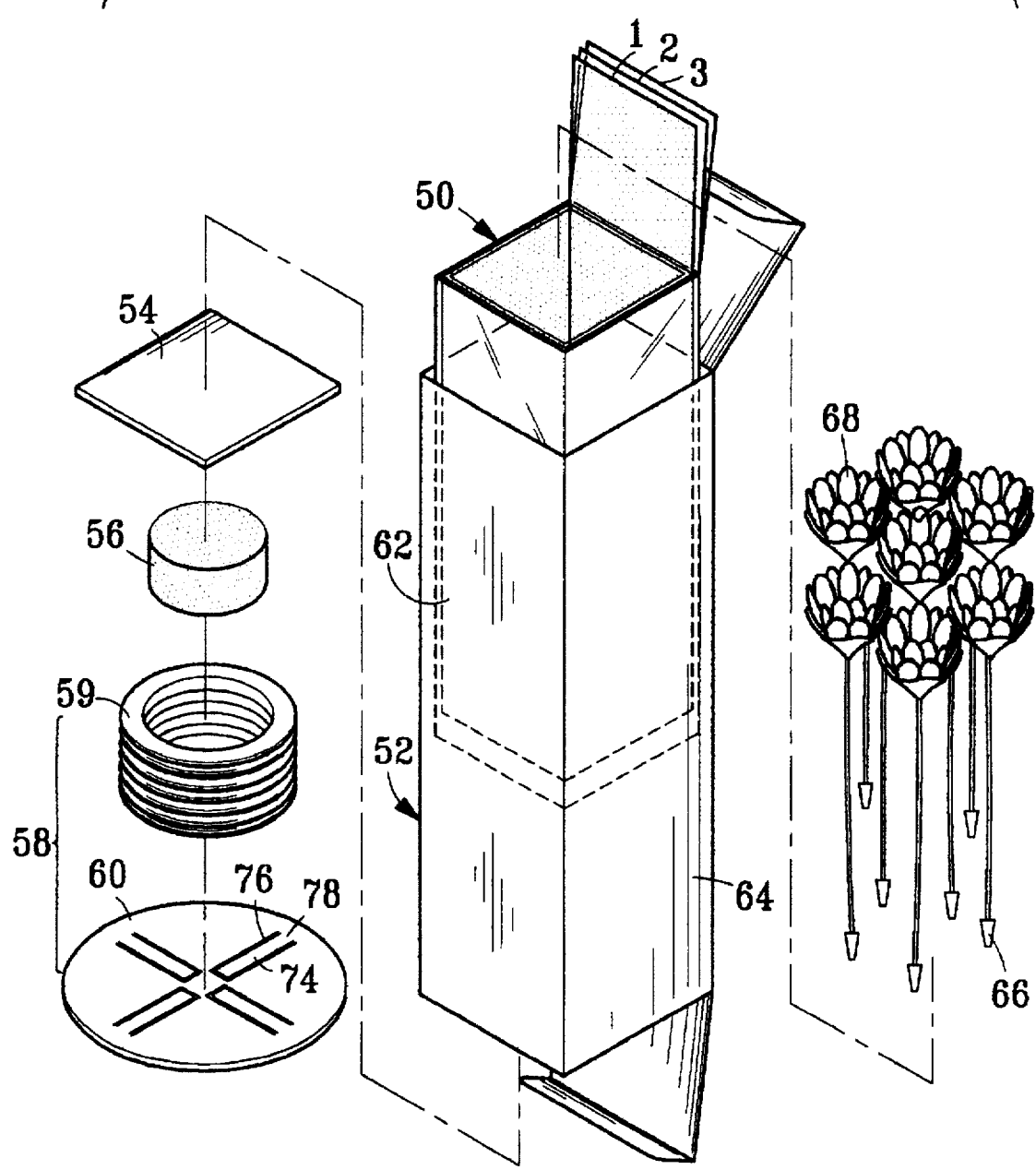
Figure 8:
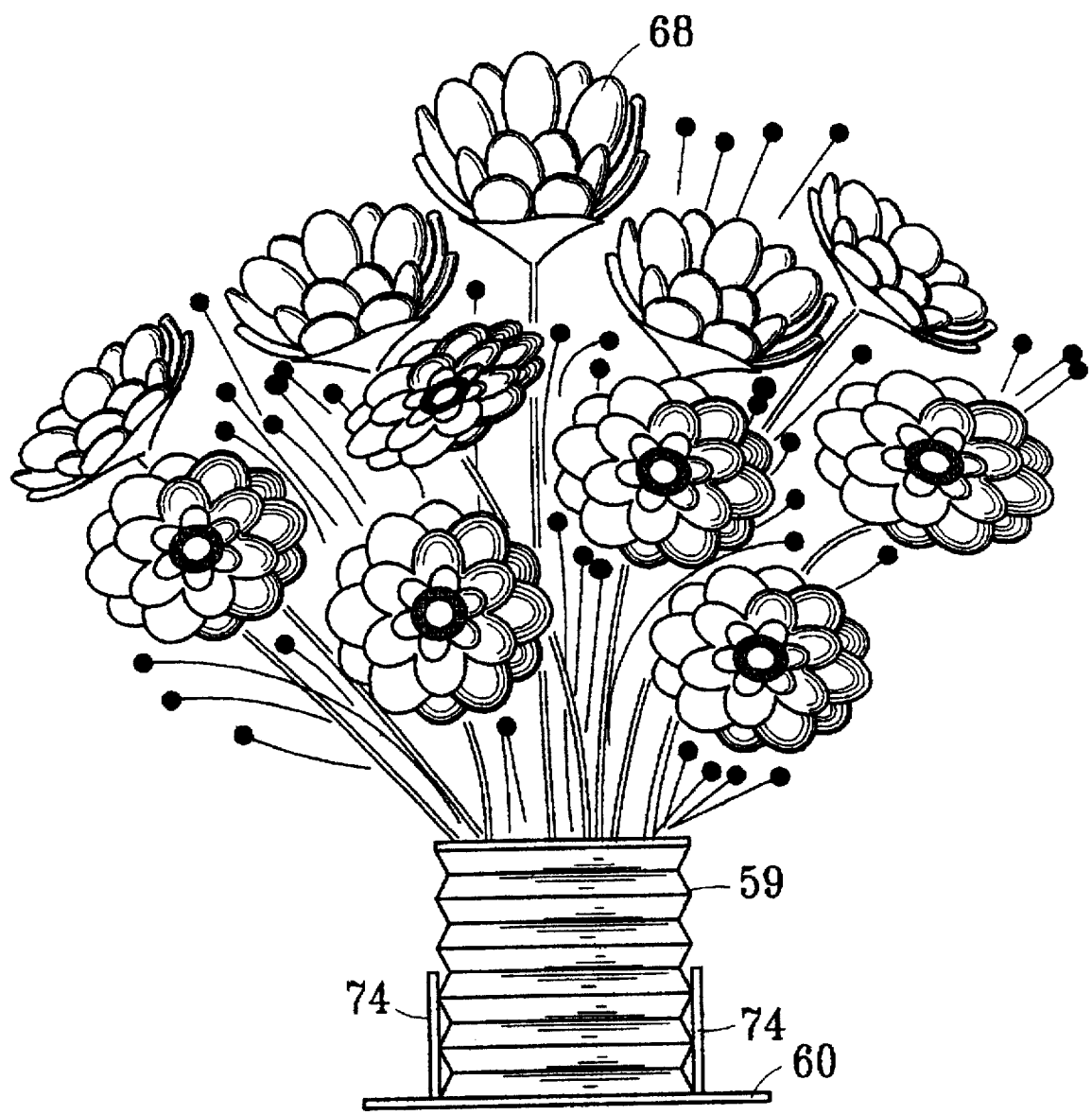
Figure 9:
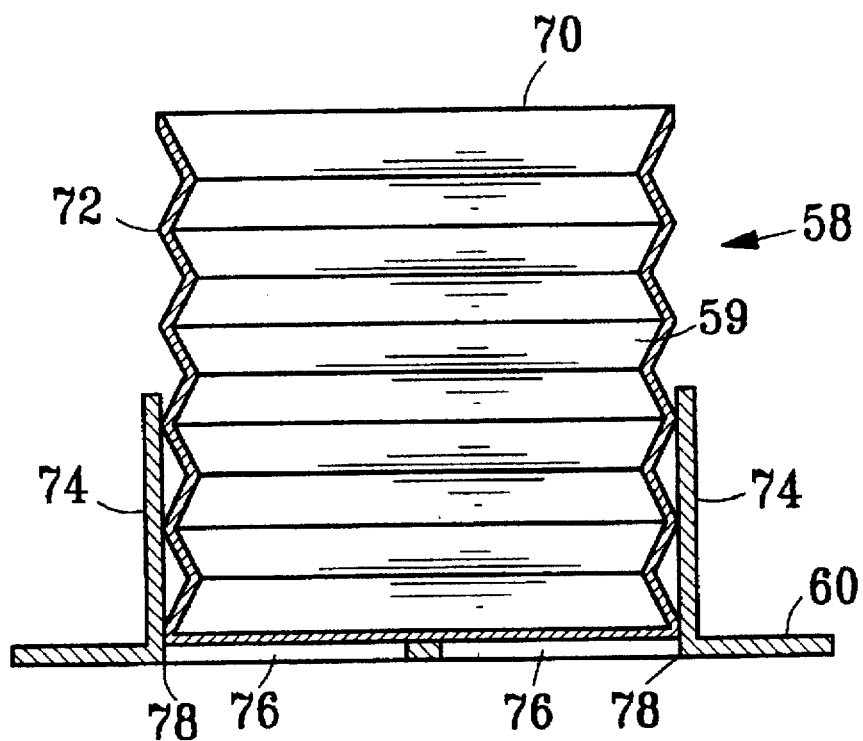
Figure 10:
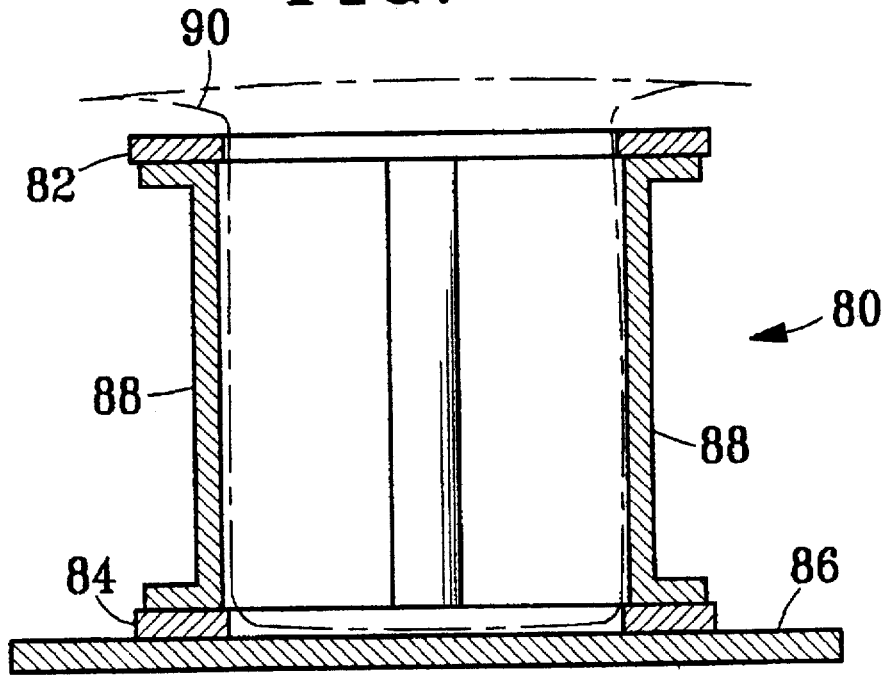

FIG. 2 shows a cross sectional view of a composite bag employed in the agricultural product preserving device of FIG. 1;

FIG. 3 shows a perspective view of arrangement of agricultural product in the composite bag of FIG. 2;

FIG. 4 shows how a first preferred embodiment of the container employed in the composite bag of FIG. 3 is used to contain a bunch of flowers;

FIG. 5 shows how a second preferred embodiment of the container employed in the composite bag of FIG. 3 is used to contain a bunch of flowers;

FIG. 6 shows an exploded view of the container of FIG. 5;

FIG. 7 shows how a third preferred embodiment of the container employed in the composite bag of FIG. 3 is used to contain a bunch of flowers;

FIG. 8 shows the arrangement of flowers on a pot bundled with the container of FIG. 7;

FIG. 9 shows the pot of FIG. 8 in expanded condition;

FIG. 10 shows another embodiment of the pot; and

Figure 11:
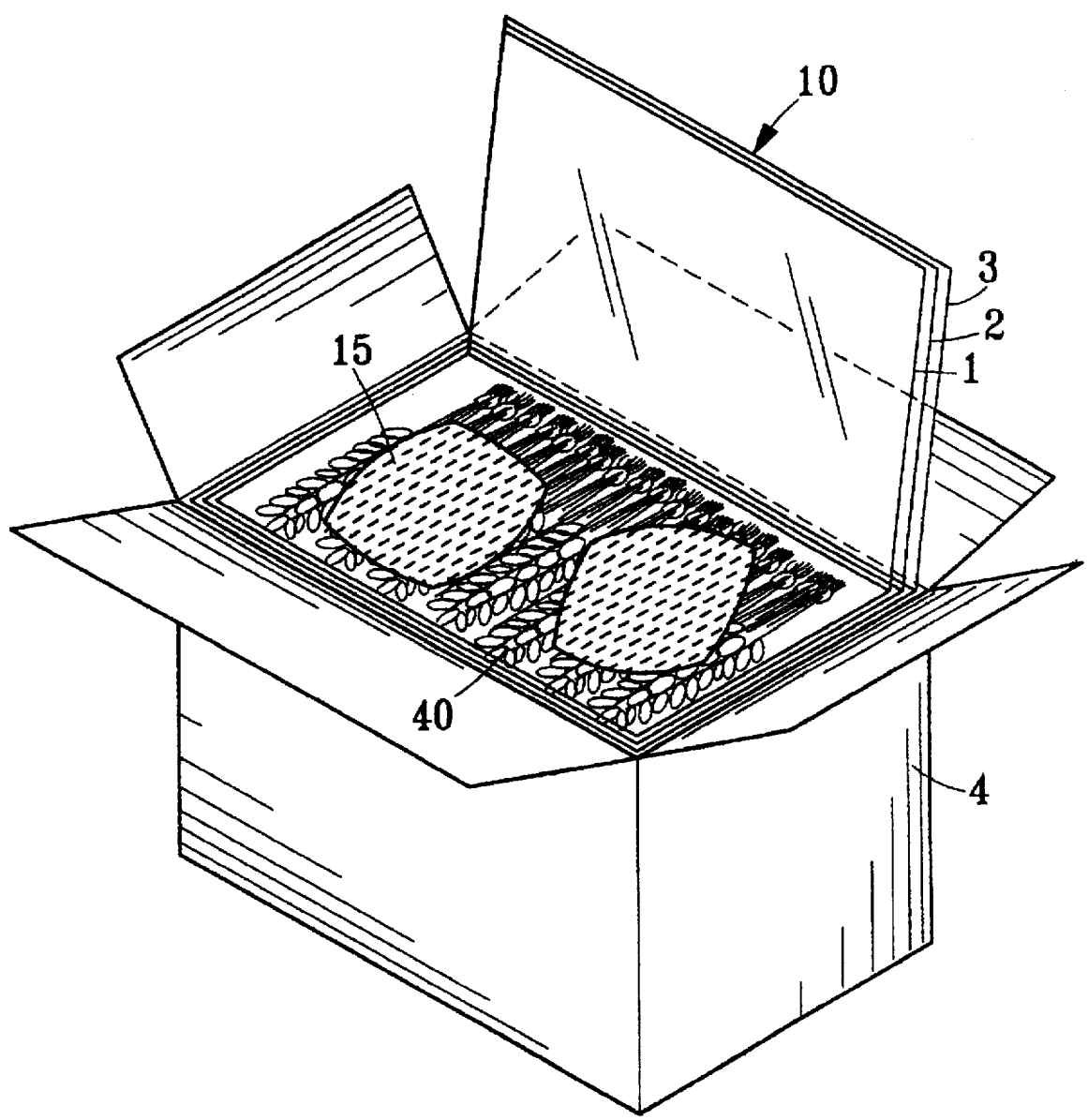

FIG. 11 shows the use of cooling material on the composite bag.

DETAILED DESCRIPTION OF PREFERRED EMBODIMENT

Referring to FIG. 1 and FIG. 2, an embodiment of the agricultural product preserving device employs a package box 4, which can be a paper box normally used to pack vegetables, and a composite bag 10 placed in the package box 4. The agricultural products that need to be preserved is packed in the composite bag 10 and then the whole package box 4 is placed in a refrigeration room for low-temperature storage.

As shown in FIG. 2, the composite bag 10 is composed of a one-way infiltrative layer 1, an absorbent layer 2, and an air-permeable waterproof layer 3. The one-way infiltrative layer 1 is made of non-woven fabric structured with capillaries 11 capable of drawing the exhalement as moisture and carbon dioxide from the agricultural product from the inside to the outside while preventing outside moisture and air from infiltrating therethrough to the inside. This allows the agricultural product contained in the composite bag 10 to be kept dry for long-term preservation. The absorbent layer 2 is attached to the one-way infiltrative layer 1 and made of a water-absorbent material capable of holding the moisture drained through the capillaries 11 in the one-way infiltrative layer 1 while allowing the carbon dioxide to pass therethrough. This can prevent the agricultural product from becoming rotten due to the existence of the moisture. The air-permeable waterproof layer 3 is layered on the absorbent layer 2 and which is made of an inorganic porous compound consisting of polyethylene and zeolite, capable of absorbing and thereby removing the carbon dioxide passing through the absorbent layer 2. This allows the composite bag 10 to be depleted of carbon dioxide, thereby retarding the growth of the agricultural product contained therein and thus the agricultural product can be prevented from withering too early. In addition, the air-permeable waterproof layer 3 is capable of preventing the moisture held in the absorbent layer 2 from draining to the outside (the freezing air in the refrigeration room contributes to the loss of moisture). By means of the absorbent layer 2, the moisture exhaled from the agricultural product can be absorbed; and by means of arranging the one-way infiltrative layer 1 between the agricultural product and the absorbent layer 2, the humidity level between the two can be maintained in balance so that the agricultural product can be preserved under moderate humidity to prevent it from withering.

The composite bag 10 further has its inside provided with a heat-dissipating tube 12 having a multiplicity of vents 14. The heat-dissipating tube 12 has a hollowed inside and is sized with a length substantially equal to the height of the composite bag 10. The provision of the heat-dissipating tube 12 allows the heat and vapor produced due to the squeezing among various pieces of the agricultural product contained in the composite bag 10 to enter through the vents 14 into the hollowed inside 15 of the heat-dissipating tube 12. Thereafter, the vapor is drained to the top of the composite bag 10 where the vapor is absorbed by the absorbent layer 2 and the heat penetrates through the composite bag 10 to the ambiance. By means of this, the humidity and temperature in the composite bag 10 can be maintained at appropriate levels for better preservation of the agricultural product contained in the composite bag 10. The provision of the heat-dissipating tube 12 is not limited to just one; depending on the capacity of the agricultural product contained in the composite bag 10, more than one heat-dissipating tube 12 can be mounted.

Referring to FIG. 3, agricultural products as flowers can be distributed in several separate containers 20 which are then orderly placed in the composite bag 10. Since several separate containers 20 are used to contain the flowers, adequate space is left among the containers 20 so as to facilitate heat dissipation. The drawback of the producing of heat and vapor due to squeezing in large quantity of the agricultural product is thus minimized.

Referring further to FIG. 4, each of the separate containers 20 can be used to contain one small bunch of orchids 16 so that a large quantity of the orchid can be prevented from being injured due to squeezing by dividing it into a number of bunches and containing these bunches each in one of the containers 20. Before each bunch is placed in the container 20, the roots of the orchid 16 is wrapped by a moist-containing material 17 and then the whole bunch of orchids is packed in an air-permeable sack 18 which is then placed in the container 20. To store the orchid 16, the containers 20 are orderly placed in the composite bag 10 and then the whole composite bag 10 is placed in the refrigeration room for low-temperature preservation. The orchid thus preserved can maintain its freshness for several weeks.

Referring to FIG. 5 and FIG. 6, the aforementioned container 20 can be further divided by a separator 21 into an upper compartment 22 and a bottom compartment 23. The upper compartment 22 is used to contain the orchid along with its root which is wrapped by the moist-containing material 17; and the bottom compartment 23 is used to contain nurturing means including nurturing soil 24, a pot 25, fertilizer 26, and a basin 27. The nurturing soil 24 is placed besides the pot 25 and the fertilizer 26 is placed in the hollowed inside 28 of the pot 25. The basin 27 covers the opening of the hollowed inside 28 of the pot 25. The consumer can purchase the container 20 as shown in FIG. 5 which contains a bunch of orchids and all the necessary nurturing means. At home, the consumer can remove the top cover 29 or bottom cover 30 on the container 20, take out the orchid and the nurturing means, and then plant the orchid by placing the pot 25 upon the basin 27 and then filling the nurturing soil 24 and the fertilizer 26 in the hollowed inside 28 of the pot 25.

Referring to FIG. 7 and FIG. 8, besides planting the orchid as illustrated in FIG. 6, the package also allows the customer to arrange the orchid in any various ways he/she likes. Similarly in the example shown here, an air-permeable container 52 is divided by a separator 54 into a top compartment 62 and a bottom compartment 64. The top compartment 62 is used to contain a bunch of orchids 68 along with the roots which are wrapped by a moist-containing material 66; and the bottom compartment 64 is used to contain a chunk of nurturing medium 56 and a combination pot 58. A composite bag 50 wraps the inner wall of the container 52 so the container 52 can be placed in refrigeration room for low-temperature storage. The combination pot 58 is composed of a collapsible member 59 and a base plate 60. The collapsible member 59 has a bellows-like body 72 which makes it collapsible and also has an upper opening 70. When the collapsible member 59 is packed in the container 52, it can be compressed to its minimum length as that illustrated in FIG. 7 so as to effectively minimize the overall volume of the agricultural product preserving device according to the present invention. As the customer is making flower arrangement, the collapsible member 59 can be forced to expand its bellows-like body 72 to a suitable length. The base plate 60 is integrally formed with a number of collapsible supporting posts 74 arranged radially on its surface. When not in use, the supporting posts 74 are collapsed to the surface of the base plate 60, as illustrated in FIG. 7. When the customer is making flower arrangement, the supporting posts 74 are erected as illustrated in FIG. 9 and then the collapsible member 59 is placed upon the base plate 60 within the space surrounded by the erected supporting posts 74. The collapsible member 59 is thus held securely on the base plate 60. After that, the nurturing medium 56 is placed through the upper opening 70 into the collapsible member 59. With water sprayed over the nurturing medium 56, the orchid 68 can be set upright into the nurturing medium 56 to make flower arrangement as illustrated in FIG. 8.

Referring now to FIG. 10, another embodiment of the pot (here labeled with 80) includes the provision of an upper ring 82 and a bottom ring 84, a base plate 86, and a plurality of posts 88. When packed in the container 52, these elements are collapsed so as to effectively reduce the overall size of the package. In the assembly of them into a pot, the bottom ring 84 is attached onto the base plate 86 and then the posts are attached upright into the bottom ring 84. Finally, the upper ring 82 is attached to the top of the posts 88 to form a pot as illustrated in FIG. 10. The circular space surrounded by posts 88 and the upper and bottom rings 82, 84 can be placed with a plastic bag 90 used to hold a nurturing medium (not shown). Flowers can be set upright in the nurturing medium to make the flower arrangement.

Referring to FIG. 11, for agricultural products that need much lower temperature for preservation or during transportation of the composite bag 10, a number of bags 15 containing cooling material can be placed in the composite bag 10 so as to help cooling the agricultural product 40 in the composite bag 10.

In summary, the agricultural product preserving device according to the present invention is capable of preserving agricultural product for a long period of time by the use of a composite bag. It comes with several benefits. First, the present invention allows long-term preservation of agricultural products so that the supply and demand are always balanced, which prevents inflation from happening. Second, the present invention allows agricultural products as flowers to be kept fresh for a long period of time, and more moreover, it allows the customer to purchase the flower along with ready-for-use accessories used for flower arrangement. Third, the present invention allows the preservation of agricultural products to be longer than conventional means can, so that it responds better supply to regional and seasonal demand. Fourth, the long-term preservation offered by the present invention allows stable supply of the agricultural product.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. An agricultural product preserving device, comprising:

(a) an air-permeable package box;

(b) a composite bag, placed in said package box, for containing agricultural product to be preserved, said composite bag including:

(i) a one-way infiltrative layer capable of allowing moisture produced by the agricultural product to infiltrate from inside to outside while preventing moisture on the outside to penetrate therethrough to the inside;

(ii) an absorbent layer laying upon said one-way infiltrative layer, capable of holding moisture penetrating through said one-way infiltrative layer while allowing air to pass therethrough; and (iii) an air-permeable waterproof layer laying upon said absorbent layer, capable of preventing moisture held in said absorbent layer from draining to the outside while allowing air to penetrate therethrough to the outside; and (c) a heat-dissipating tube placed in said composite bag, said heat-dissipating tube having a hollowed inside for dissipating heat.

2. An agricultural product preserving device as claimed in claim 1, wherein said one-way infiltrative layer is made of non-woven fabric, said absorbent layer made of water-absorbent material, and said air-permeable waterproof layer made of an inorganic porous compound consisting of polyethylene and zeolite.

3. An agricultural product preserving device as claimed in claim 1, wherein a plurality of separate containers are used to contain the agricultural product and said plurality of separate containers are packed in said composite bag.

4. An agricultural product preserving device as claimed in claim 3, wherein each of said plurality of separate containers is attached with one composite bag.

5. An agricultural product preserving device as claimed in claim 3, wherein each of said plurality of separate containers is divided by a separator into a first compartment for containing the agricultural product and a second compartment for containing a set of nurturing implements for planting the agricultural product.

6. An agricultural product preserving device as claimed in claim 5, wherein said nurturing implements includes nurturing soil, a pot, fertilizer, and a basin.

7. An agricultural product preserving device as claimed in claim 5, wherein said nurturing implements includes nurturing medium and a combination pot.

8. An agricultural product preserving device as claimed in claim 7, wherein said combination pot includes a bellows-like body and a base plate, said base having a plurality of collapsible posts arranged radially thereon, said collapsible post being erected to support said bellows-like body mounted on said base plate.

9. An agricultural product preserving device as claimed in claim 7, wherein said combination pot includes an upper ring and a bottom ring, a base plate, and a plurality of posts, said bottom ring being attached upon said base plate, said plurality of posts being set upright upon said bottom ring, and said upper ring being attached on top of said plurality of posts.

* * * * *